(12) United States Patent
Wilson et al.

(10) Patent No.: US 6,437,855 B1
(45) Date of Patent: Aug. 20, 2002

(54) LASER DOPPLER VELOCIMETER WITH HIGH IMMUNITY TO PHASE NOISE

(75) Inventors: Mark L. Wilson, Vadnais Heights; David Kubisiak, Chanhassen, both of MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/615,023

(22) Filed: Jul. 13, 2000

(51) Int. Cl.$^7$ .................................................. G01P 3/36
(52) U.S. Cl. ..................................................... 356/28.5
(58) Field of Search ..................... 356/28.5, 28; 367/90; 342/104–117

(56) References Cited

U.S. PATENT DOCUMENTS

| | | | |
|---|---|---|---|
| 3,912,915 A | | 10/1975 | Kalb et al. |
| 3,915,572 A | | 10/1975 | Orloff ..................... 356/106 R |
| 4,036,557 A | | 7/1977 | Christensen ................. 356/28 |
| 4,181,432 A | * | 1/1980 | Flower ........................ 356/28 |
| 4,263,002 A | | 4/1981 | Sathyakumar .............. 356/349 |
| 4,284,351 A | * | 8/1981 | Alldritt et al. ............. 356/28.5 |
| 4,340,299 A | * | 7/1982 | Mongeon ................... 356/28.5 |
| 4,470,696 A | | 9/1984 | Ballard ...................... 356/28.5 |
| 4,596,254 A | * | 6/1986 | Adrian et al. ............... 128/666 |
| 4,601,580 A | | 7/1986 | Halliwell |
| 4,669,876 A | | 6/1987 | Dopheide .................... 356/285 |
| 4,715,707 A | * | 12/1987 | Reynolds, III et al. ..... 356/28.5 |
| 4,843,564 A | | 6/1989 | Jenson ....................... 364/510 |
| 4,919,532 A | * | 4/1990 | Mocker et al. ............. 356/28.5 |
| 5,104,745 A | | 4/1992 | Cave et al. ................. 428/607 |
| 5,187,538 A | | 2/1993 | Iwamoto et al. ........... 356/28.5 |
| 5,325,175 A | | 6/1994 | Mocker et al. .............. 356/351 |
| 5,327,222 A | | 7/1994 | Makoto |
| 5,587,785 A | | 12/1996 | Kato et al. ................. 356/28.5 |
| 5,812,250 A | | 9/1998 | Ishida et al. ............... 356/28.5 |
| 5,831,720 A | | 11/1998 | Ishida et al. ............... 356/28.5 |
| 6,078,384 A | * | 6/2000 | Dammann et al. ......... 356/28.5 |

OTHER PUBLICATIONS

Patent Abstracts of Japan, vol. 016, No. 568 (P–1458), Dec. 9, 1992 and JP 04 220588 A (Akuto Denshi KK), Aug. 11, 1992 Abstract.

J.B.Abbis et al: "Laser Dopper Anemometry", Optics and Laser Technology, vol. 6, No. 6, Dec. 1994, pp. 249–261, XP002191256, Elsevier Science Publishers BV., Amsterdam., NL ISSN: 0030–3992, p. 253, Left–Hand Column, Paragraph 3, p. 253, Left–Hand Column, Last Paragraph—Right–Hand Column, Paragraph 2.

* cited by examiner

Primary Examiner—Thomas H. Tarcza
Assistant Examiner—Brian Andrea
(74) Attorney, Agent, or Firm—Kris T. Fredrick (57) ABSTRACT

Signal processing methods are disclosed for processing Laser Doppler Velocimeter (LDV) signals. A true Doppler frequency is extracted from the phase noise frequencies by maintaining a highest frequency value. The highest frequency value is replaced with any measured frequency values that are higher than the current highest frequency value. This is continued for a predetermined lifetime period, after which the highest frequency value is stored and then reinitialized. The highest detected frequency values over a window of lifetimes are then averaged to provide a moving or rolling average value which is indicative of the velocity of a medium.

29 Claims, 9 Drawing Sheets

LASER DOPPLER VELOCIMETER WITH HIGH IMMUNITY TO PHASE NOISE

FIELD OF THE INVENTION

The present invention relates generally to electronic sensors and instrumentation for measuring the velocity of moving media. More specifically, the present invention relates to Laser Doppler Velocimeters, and methods for processing the signals received therefrom.

BACKGROUND OF THE INVENTION

Laser Doppler Velocimeters (LDVs) are commonly used in many industrial and related applications. Laser Doppler Velocimeters (LDVs) operate on the principle that when a laser beam scatters off a moving object, the frequency of oscillation is altered by the Doppler effect. In operation, LDVs often provide two crossing laser beams from the same laser source, with a small angle therebetween. The measurement volume where the velocity information is obtained is defined by the region in space where the two beams cross. The light scattered from the first beam is Doppler shifted slightly higher in frequency because the object is moving toward the beam. Likewise, light scattered from the second beam is Doppler shifted slightly lower in frequency because the object is moving away from the beam. The scattered light signal is gathered using a collection lens, and when the two scattered signals are mixed together on a photo diode, a difference frequency can be obtained. The velocity of the object is directly proportional to the difference frequency.

LDV techniques have been used in many industrial applications including paper manufacturing. These systems tend to be relatively complex, expensive, and difficult to install and operate unattended for extended periods. Accordingly, LDV systems are often used for machine diagnostics purposes only.

Simple counters or phase lock loop type signal processors have been used to process LDV signals obtained from lightly seeded flow experiments where it is likely that only a single scattering particle will be present in the LDV measurement volume at any given time. However, for more heavily seeded flows, more than one scattering particle are likely to be present in the measurement volume. The location and distribution of these particles is random. The light scattering effects of two particles can add constructively to give rise to a larger signal, or add destructively to give rise to a smaller signal, often resulting in a significant amount of phase noise.

To deal with heavily seeded flows, previous devices often use autocorrelation or Fast Fourier Transforms (FFTs) to process the raw signals coming from the Laser Doppler Velocimeter to extract the desired frequency signal from the phase and amplitude noise. Both of these methods are computationally expensive, requiring rather powerful processors and large amounts of memory to effectively process the raw input signals. For example, a 5 MHz Doppler signal requires a sampling rate of at least two, and more likely three to four times, the 5 MHz Doppler signal to satisfy the Nyquist criteria. Thus, a 10–20 MHz sampling rate may be required, leading to a large number of data points to be processed.

When the LDV is used as a sensor in closed loop control of a machine or process having a short time constant, faster sampling rates may be required to properly control the machine or process. For example, 10 velocity samples per second may be needed to effectively control a fast machine or process, thus requiring 10 FFTs per second on a large number of data points. In terms of current technology, this might require a processor on the order of a 500 MHz Pentium III (® Intel Corporation).

Fast processors can be expensive relative to the desired cost of the sensor system as a whole. A fast processor can also require supporting chips and present heat dissipation problems, particularly in industrial environments where the ambient temperature is high.

What would be desirable, therefore is a method and apparatus for processing LDV signals that requires substantially less computational resources as FFT or autocorrelation methods. This may lower the cost and increase the reliability of LDV systems, particularly those used in harsh industrial environments.

SUMMARY OF THE INVENTION

The present invention includes signal processing methods for processing Laser Doppler Velocimeter (LDV) signals, and computer programs, signal processors, and LDV systems incorporating these methods. The methods provide signal processing for extracting the true Doppler difference frequency from the phase noise frequencies present in many differential Doppler signals, which can then be used to determine the velocity of the moving media.

It has been found that the highest frequency present in an LDV signal corresponds to the velocity of the medium. The Doppler phase noise is typically at random, but lower, frequencies. To identify the highest frequency, one illustrative method includes identifying the frequency in a current LDV signal, and replacing that frequency when any subsequent higher frequency is received and detected. This is continued for a predetermined time period. To allow for changes in the velocity of the medium, the highest detected frequency is released after a certain age or lifetime. The duration of the age or lifetime can be programmed to accommodate the desired response time of the system.

Preferably, the highest detected frequency for each lifetime is stored for a predetermined time, and the highest frequency readings over a window of lifetimes are averaged to provide a moving or rolling average value. This moving or rolling average can be thought of as the output of a first "averaging" filter. One or more other filter layers may also be provided. For example, a second filter may provide a moving or rolling average of the output values of the first filter. That is, the second filter may average the results of the first filter until it is time to output a result. A simple summation and averaging of the first filter output may be performed at a configurable update frequency. In a preferred embodiment, the update frequency is about 10 times per second.

To eliminate gross errors, the highest detected frequency for each lifetime may be compared to the highest detected frequency of the last or other lifetimes, and rejected if the change is too great. Since the highest detected frequency values can be filtered by, for example a rolling average filter, any gross errors may disproportionately skew the rolling average values.

DETAILED DESCRIPTION OF THE INVENTION

Figure 1:
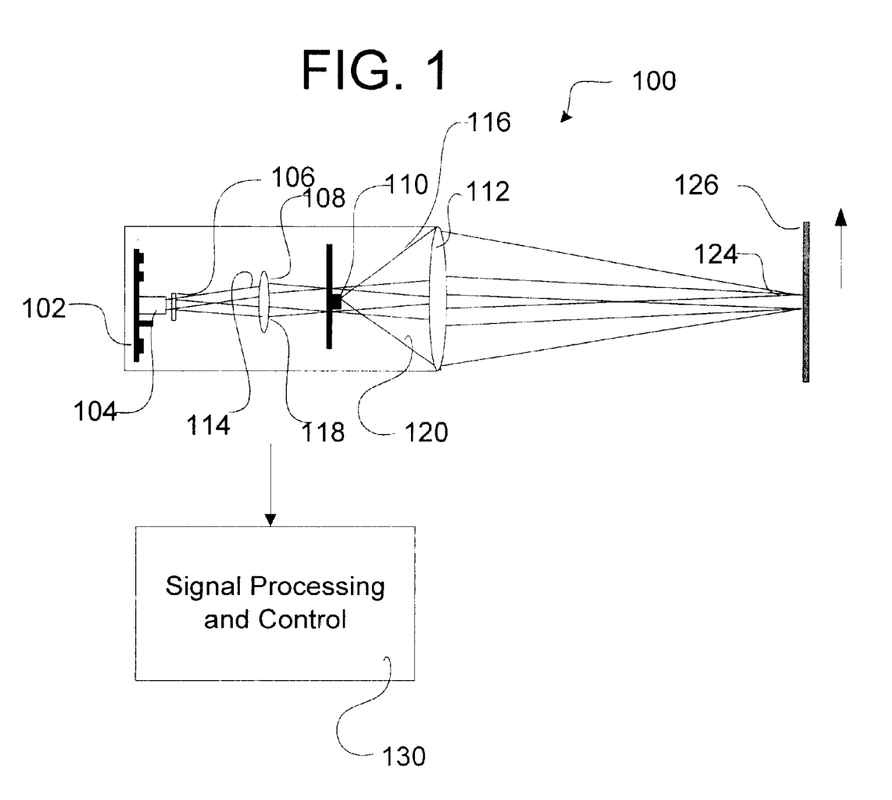
FIG. 1 is a schematic view of a Laser Doppler Velocimeter (LDV) and moving media being measured.

FIG. 1 illustrates an LDV sensor 100 having laser electronics 102, a laser emitter 104, a holographic optical element (HOE) 106, a first focusing lens 108, and an emitted laser light indicated by light beams 114 and 118. The emitted light strikes a measurement volume of media 124 along a moving plane 126. Reflected light is indicated by light beams 116 and 120, which pass through a collection lens 112, focusing the light on a photodiode 110. Electronic connection lines (not shown) feed the electronic signal from photodiode 110 to signal converting and processing circuitry 130 which can include counters, general purpose computers, microprocessors, and/or other supporting circuitry.

By utilizing the differential Doppler effect, the Doppler frequency can be obtained directly. This is accomplished by crossing the two laser beams from the same laser with a small angle between the beams. The measurement volume 124 where the velocity information can be obtained is defined by the region in space where the two beams cross. The light scattered from beam 118 is Doppler shifted slightly higher because the object is moving toward the beam. Similarly, light scattered from beam 114 is Doppler shifted slightly lower because the object is moving away from the beam. The scattered light signal is gathered using collection lens 112, and when these two scattered signals are mixed together on photodiode 110, the difference frequency which is directly proportional to the velocity of the object is obtained.

The equation that describes the functional relationship between the parameters is $$f_d = \frac{2V \sin(\theta/2)}{\lambda} \quad \text{(Equation 1)}$$

where, $f_d$=Doppler frequency
V=x component of velocity of the object
θ=Total angle between the crossing laser beams
λ=Wavelength of the laser light The light scattered from the two beams mixes together on photodiode 110 which acts as a square law device yielding the difference frequency. The mixing of these two beams together reduces the frequency measurement requirement from $10^{15}$ Hertz down to a few megahertz which can be more easily measured. The scattered light signal is gathered using the collection lens onto the photodiode which converts the light signal to an electrical signal.

Figure 2:
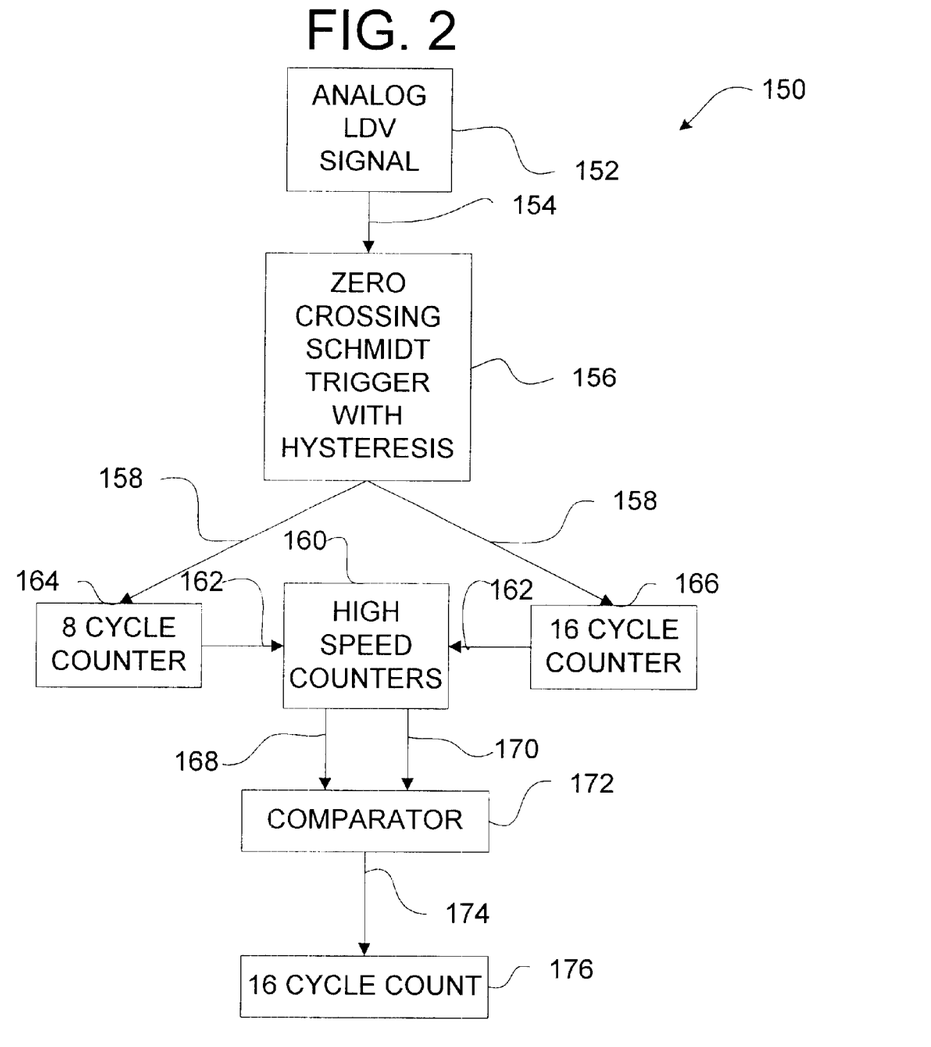
FIG. 2 is a block diagram of a circuit for digitizing an analog LDV signal, and counting and prequalifying the frequency.

FIG. 2 illustrates a highly diagrammatic block diagram of a circuit used to convert the analog LDV signal provided by the photodiode 110 to a digital frequency signal, prequalify or error check the signal, and pass a qualified signal through. An analog LDV signal source is represented at 152, and may correspond to photodiode 110 of FIG. 1. In the illustrative embodiment, the analog LDV signal 154 is passed to a zero crossing Schmidt trigger with hysteresis 156 to convert the analog LDV signal to a digital signal 158 with the same frequency. Zero crossing Schmidt trigger 156 provides an accurate frequency which is unaffected by the magnitude of the signal.

High-speed counters 160 can be used to determine the Doppler frequency in an inexpensive way. Since the laser beam's wavelength λ, and the crossing angle θ are fixed and known, the velocity can be derived from this frequency measurement. The counters 160 may measure the length of time it takes to count a fixed number of cycles of the Doppler frequency, which, in a preferred embodiment, is 16 cycles. The time accuracy is determined by the speed of a clock feeding the high speed counters 160, which in a preferred embodiment is a 50 MHz clock signal. In one embodiment, counters 160 are preferably able to measure frequencies between 500 Hz and 5 MHz, a 10,000:1 range.

In the embodiment illustrated in FIG. 2, high speed counters block 160 actually includes two separate counters, which are used for data verification or prequalification to eliminate bad data points. A first counter is used to measure the time it takes to count 8 Doppler cycles 164, while a second counter measures the time it takes to count 16 Doppler cycles 166, as shown. A comparator 172 is then used to compare the two counts or times 168 and 170. If the time 168 of 8 cycles is not substantially half of that for 16 cycles 170, the data is determined to be invalid. If the data is valid, the time required to count 16 cycles is passed through at 174, to a register 176. In its raw form, the time can be stored as clock counts. If the data passes this test, the Doppler frequency is determined by the following relationship:

$$f_d = \frac{N_c}{N * \tau} \quad \text{(Equation 2)}$$

where, $N_c$=number of cycles counted (in this case 16)
N=number of clock cycles counted by counter
τ=clock cycle time (1/50 MHz=20 ns).

By combining the previous two equations, it can be shown that the velocity is inversely proportional to the digital number N, or in this case sixteen. The constant of proportionality is a function of the wavelength, crossing angle, number of Doppler cycles counted, and the clock cycle time. A simple microprocessor can output the velocity information easily from the digital counter data. The microprocessor can also be used to correct the data for thermal effects, and to provide a smart interface to other computers or controller systems.

The LDV signal processor presently described is suitable for measurement in both lightly and heavily seeded flows in general. LDV signals can be obtained from moving solid surfaces, such as a paper machine. In solid surface applications, there can be a large number of scattering particles randomly distributed on the surface. In general, the phase noise associated with a random distribution of scattering centers entering and leaving the measurement volume gives rise to a noise signal which has all frequencies less than the Doppler frequency equally probable.

The present signal processor algorithm uses the fact that during any given interval, some non-phase Doppler signals occur. The non-phase Doppler signals are typically at random, but lower frequencies than the desired difference Doppler frequency. Thus, to identify the desired difference Doppler frequency, the present invention contemplates sequentially measuring discrete Doppler signal frequencies over a given period of time (e.g., lifetime). Some of the measured Doppler signal frequencies will correspond to non-phase noise, while others will approach or be at the desired difference Doppler frequency. To identify the highest frequency, each discrete Doppler frequency is compared with a previous highest reading, over a programmable Lifetime interval. Then, the resulting highest frequency reading is stored for later processing, and another Lifetime interval begins. If the most recent highest frequency reading is quite different from the previous highest frequency reading, it can be eliminated as a good signal.

Several of the previous highest frequency readings can be averaged or otherwise filtered to provide a smoothened output signal. In a preferred embodiment, the number of highest frequency values used in the average is related to a Window parameter. All valid highest frequency values within the Window may be used to calculate a rolling average. Thus, two parameters are used in one signal processing algorithm embodiment, the Lifetime interval and the averaging Window size.

Figure 3:
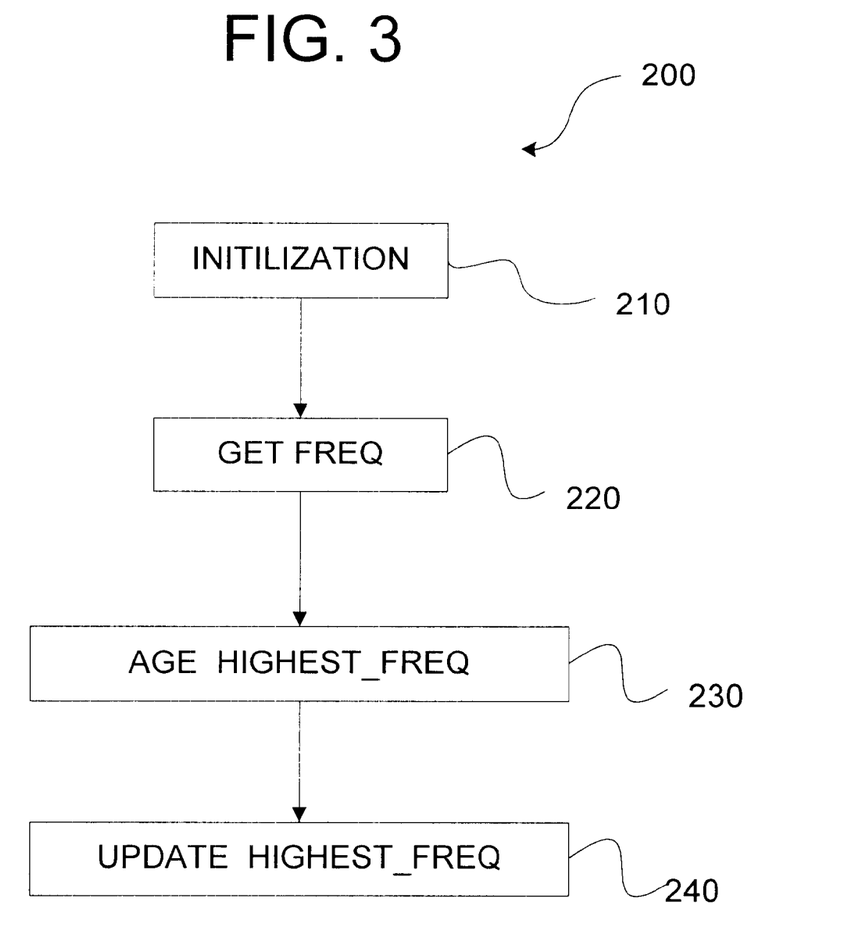
FIG. 3 is a flowchart of a method for processing an LDV signal.

Referring now to FIG. 3, one signal processing method 200 is illustrated. In brief, method 200 utilizes and holds the highest frequency obtained for a number of cycles up to the maximum Lifetime interval, whereupon a new highest frequency value is obtained. Method 200 includes an INITIALIZATION step 210 which can include code for initializing parameters, variables, timers, and counters used in the algorithm. In particular, INITIALIZATION step 210 can be used to initialize parameters, variables, timers, and counters the first time through the signal processing algorithm or the first time through the algorithm after an upset or a reset. In some embodiments, an initialization step is omitted, with the first pass through the algorithm producing less than optimal results.

A GET FREQUENCY step 220 follows INITILIZATION step 210 and can include various preprocessing steps. GET FREQUENCY step 220 preferably obtains a measurement of the current Doppler frequency. This can be accomplished in any number of ways. In one illustrative embodiment, and as described above with respect to FIG. 2, the current Doppler frequency can be obtained by counting the number of clock cycles of a high speed clock that occur before a predetermined number of Doppler cycles are reached. The current Doppler frequency value can then be determined by dividing the predetermined number of Doppler cycles by the number of clock cycles counted, times the period of the high speed clock.

In another illustrative embodiment, the current Doppler frequency can be obtained by providing the LDV output signal to a counter, which counts the number of Doppler cycles over a predetermined time period, such as over a predetermined number of clock cycles of a high speed clock.

The current Doppler frequency can then be determined by dividing the counter value by the predetermined number of clock cycles, times the period of the high speed clock. It is contemplated that the current Doppler frequency values may be represented as a raw pulse count for internal computation, and only later converted to frequency units if desired.

An AGE HIGHEST FREQUENCY step 230 can follow and be used to purge the system of the previous highest frequency if that highest frequency's age is greater than the age limit imposed by the Lifetime parameter. In one embodiment, a timestamp is supplied for each frequency at the time the frequency is obtained. The timestamp can be a time or a number of counts. In one embodiment, the age of the highest frequency is managed using a First In First Out (FIFO) queue. The FIFO queue can be implemented in a number of ways, including hardware, software, shift registers, or circular queues. In the FIFO queue, a frequency value is input to the queue in a first or zero position, indicating the frequency has an age of zero. With the next cycle, the frequency value is shifted to position one, indicating an age of one. With each cycle, the frequency value is effectively shifted to the next position. In a four-place queue which can represent a Lifetime parameter of four, when the frequency is shifted out of the last or fourth place in the FIFO queue, the frequency has been aged out. The shifting of the frequencies through the queue can, of course, be accomplished by shifting indices or pointers, rather than the values themselves.

An UPDATE HIGHEST FREQUENCY step 240 can be used to update the present highest frequency HIGHEST_FREQ value with the most recently obtained frequency value if the most recently obtained frequency value is higher. In one embodiment, the HIGHEST_FREQ value is stored as an index or pointer into the FIFO queue. When the HIGHEST_FREQ value is aged out, it may be replaced with a non-valid value such as a negative or null value, indicating that the HIGHEST_FREQ value is to be replaced with the next valid value obtained. Alternatively, the HIGHEST_FREQ value is initialized to zero when the HIGHEST_FREQ value is aged out. In some embodiments, as further discussed below, the HIGHEST_FREQ value is used directly as an indication of the medium velocity. In a preferred embodiment, however, the HIGHEST_FREQ value is further filtered before being used as an indication of medium velocity.

Figure 4:
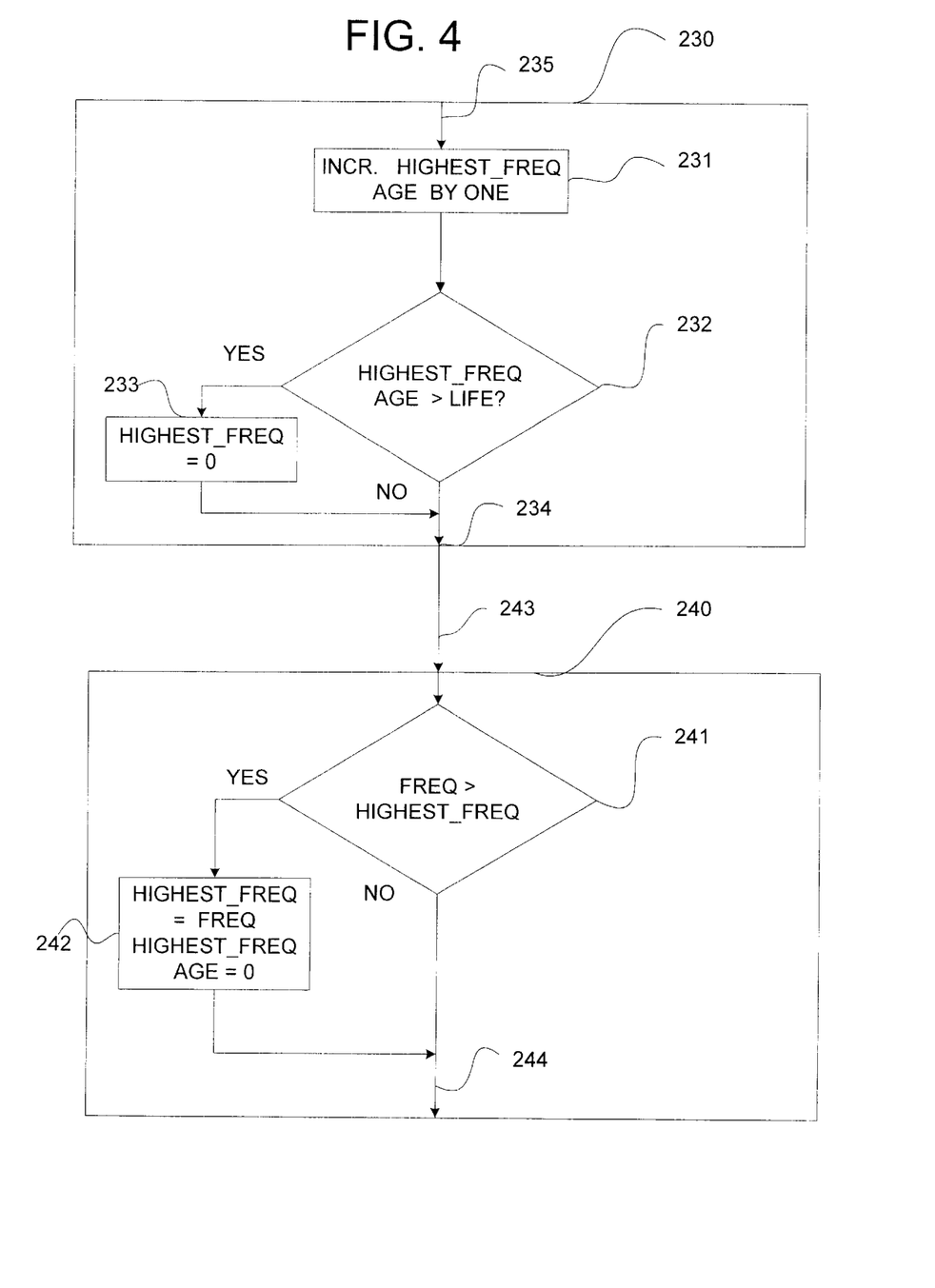
FIG. 4 is a flowchart of highest frequency aging and selection steps of a signal processing method.

Referring now to FIG. 4, one embodiment of an AGE HIGHEST_FREQ step 230 is illustrated in greater detail. Step 230 receives a frequency or count 235 in a new cycle, and increments the age of the HIGHEST_FREQ by one in step 231, for example, by bumping the HIGHEST_FREQ place in a FIFO queue. In step 232, a decision is made whether the HIGHEST_FREQ has an age greater than the maximum age allowed by the LIFE parameter. In one embodiment, this is a determination of whether the HIGHEST_FREQ has been bumped out of the FIFO queue. If the HIGHEST_FREQ age is greater than the LIFE parameter, the HIGHEST_FREQ may be set to a zero value as shown in step 233. In other embodiments, the HIGHEST_FREQ is set to a negative value, a recognizable non-valid value, or a flag is set indicating the age is too great. The HIGHEST_FREQ value can be output as indicated at 234.

FIG. 4 also shows an illustrative UPDATE HIGHEST_FREQ step 240 of FIG. 3 in greater detail. The current HIGHEST_FREQ and the current FREQ values are input at 243 to a decision step 241 which tests whether the current FREQ value is greater than the current HIGHEST FREQ value. If this is the case, the HIGHEST_FREQ is set to the FREQ value, and the current FREQ becomes the HIGHEST_FREQ for the current cycle. The HIGHEST_FREQ can only go up until the age is greater than the Lifetime parameter in this illustrative embodiment. The HIGHEST_FREQ can be output as indicated at 244 for further use.

Figure 5:
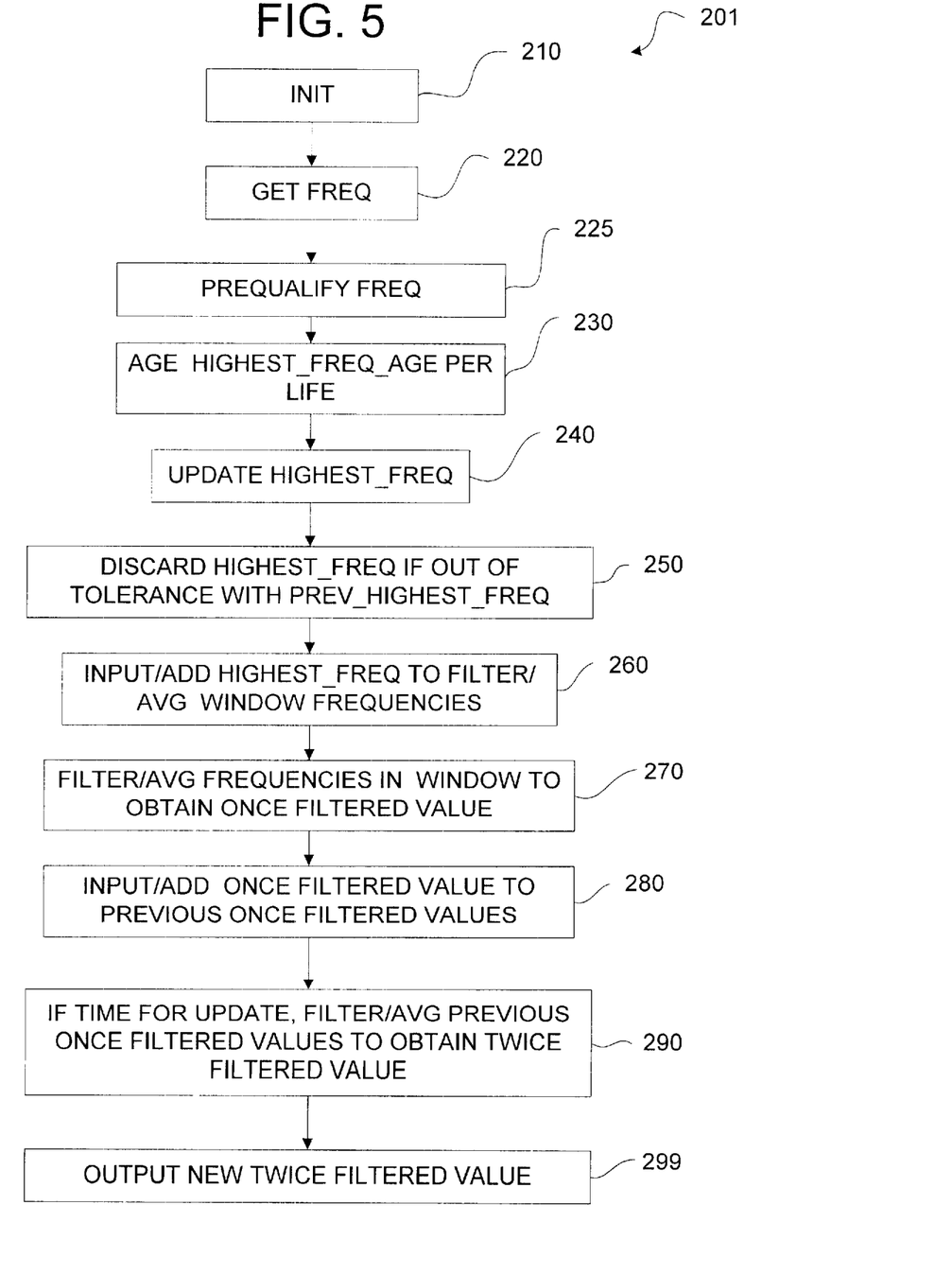
FIG. 5 is a flowchart of a method for processing an LDV signal.
Figure 6:
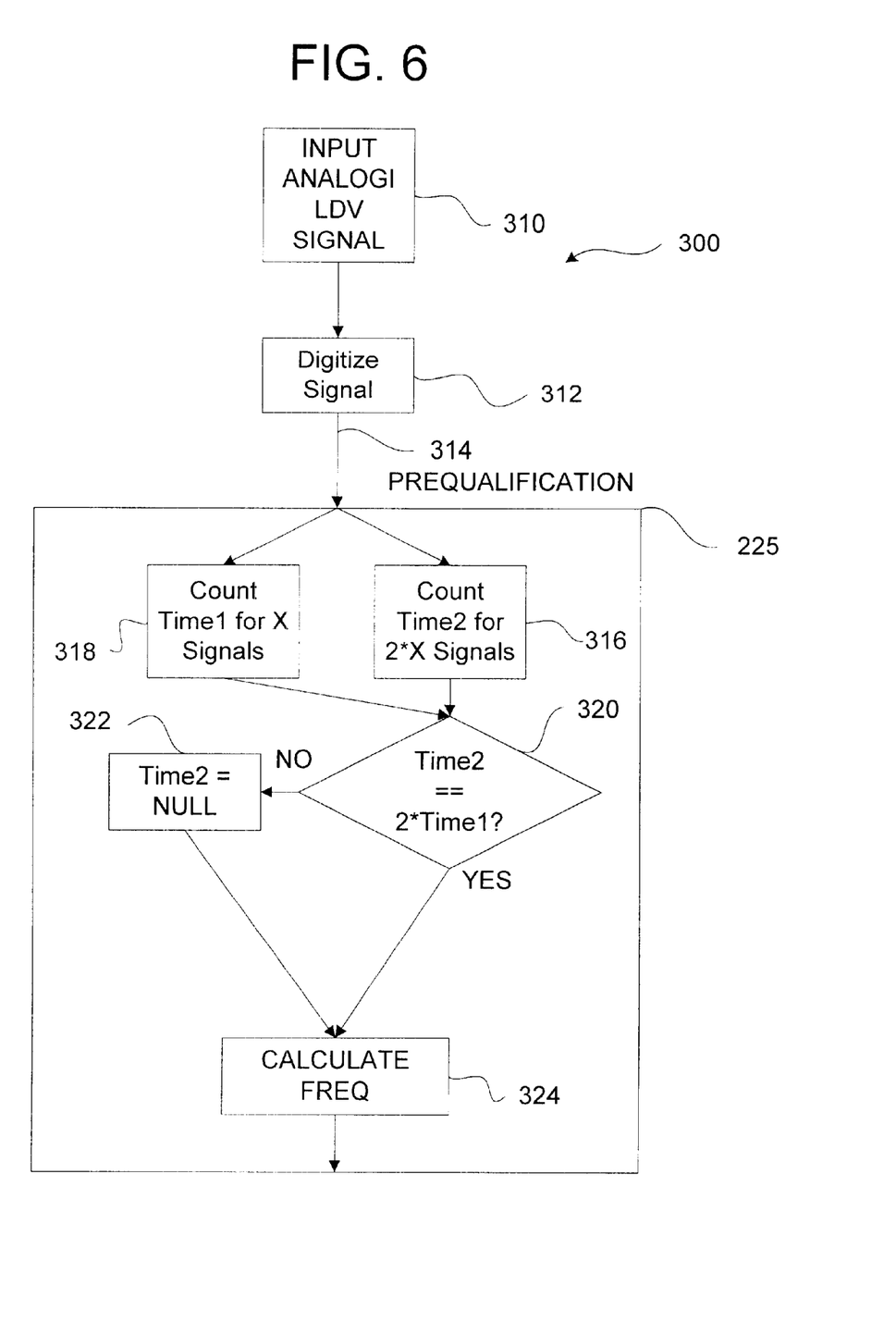
FIG. 6 is a flowchart of digitization and prequalification steps in a signal processing method.
Figure 7:
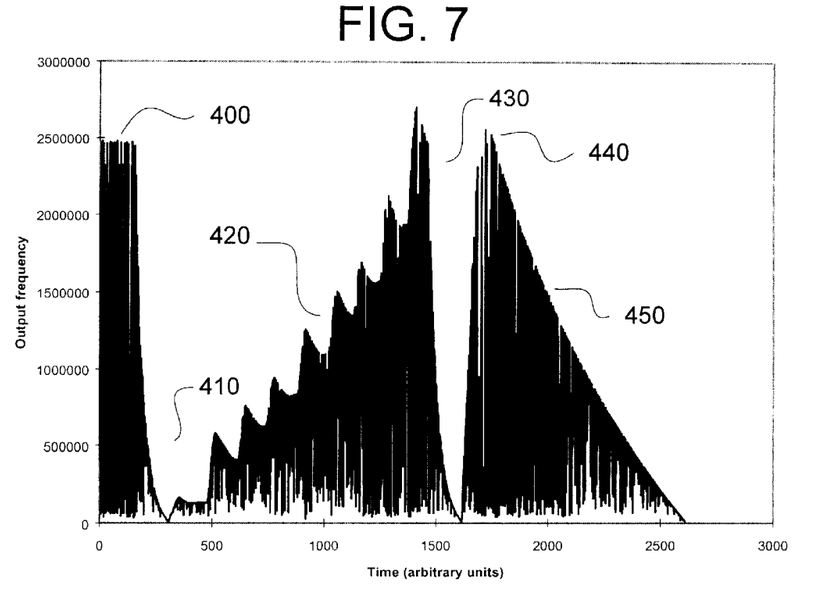
FIG. 7 is a plot of raw LDV frequencies versus time for a rotating wheel surface being rotated, stopped, step-ramped up, stopped, started, and smoothly ramped down, including the multiple phase noise lower frequencies filling in under the curve.

Referring now to FIG. 5, another signal processing algorithm or method 201 is illustrated. Method 201 includes steps 210, 220, 230, and 240, previously discussed. A PREQUALIFY FREQ step 225 can be included as was discussed with respect to counters 164 and 166 and comparator 172 of FIG. 2. One embodiment of PREQUALIFY FREQ step 225 is illustrated in FIG. 6, being fed by an analog LDV signal at 310 which is digitized at 312, providing a raw digital signal 314 for prequalification. Digital signal 314 is fed to a first timer/counter 318 to count for "X" number of signals, and a second timer/counter 316 to count for a multiple of "X" number of signals, such as 2 times "X". The results are fed to a comparator step 320, which can verify that the times/counts are the expected multiples of each other. For example, the clock counts required to count 16 cycles should be twice the clock counts required to count 8 cycles. If the expected multiples are not found, as at 322, the number of counts can be set to a null or non-valid value which can be interpreted so as to not result in a valid frequency value. The frequency can be calculated from the clock counts in step 324.

Step 250 of FIG. 5 may discard the HIGHEST_FREQ value provided at the end of a Lifetime interval if it deviates too far from the previous HIGHEST_FREQ value, indicated by the variable PREV_HIGHEST_FREQ. Step 250 protects the method from outputting large changes present in the HIGHEST_FREQ, which are not likely reflective of real changes in media velocity. For example, given the time constant of a paper machine, it is unlikely that paper speed would drop 50% in a millisecond. In some embodiments, step 250 is limited to rejecting the HIGHEST_FREQ value for only a set number of cycles.

Once the HIGHEST_FREQ value is determined to be valid, it is provided to a first filter, as shown at step 260. The first filtering step 270 can be used to filter the HIGHEST_FREQ value. In a preferred embodiment, step 270 utilizes a rolling average as a filter. In a preferred embodiment, a rolling average operates on a number of previous HIGHEST_FREQ values contained in a moving window, having a WINDOW number of HIGHEST_FREQ values. In one embodiment, a WINDOW number of HIGHEST_FREQ values are contained within a FIFO queue, whose members are averaged to obtain the rolling average.

In one embodiment, the once filtered value obtained from step 270 is further filtered in a second filter step including steps 280 and 290. In one embodiment, each time a new value is output from step 270, the value is added to a total, with the number of values also incremented. In step 290, when a new output is requested from the second filter, a new value is created by obtaining the average of all the values output from step 270 since the last time the second filtered value was obtained. The twice-filtered value can be output as indicated at 299. In a preferred embodiment, a programmable or selectable UPDATE parameter determines the rate at which output from the LDV processor output can change values. In one embodiment, a 0.1 second UPDATE parameter is used, causing the value from step 290 to change only every 0.1 second, with an average thus being taken every 0.1 second.

In one embodiment, the high speed counting and prequalification are implemented in hardware, with the aging and subsequent steps being implemented in a microprocessor. One embodiment of the invention performs the signal processing algorithm in an Intel 8051, a common 8-bit microprocessor.

Experimental Results

FIGS. 7–11 illustrate the output from an LDV having varying degrees of processing, but utilizing the same raw data. The larger the value of the two parameters WINDOW and LIFE, the longer the time delay to register an actual velocity change, and the wider the distribution on measured velocities. The Figures show a plot of the LDV output frequency on the Y axis, and time on the X axis. As first illustrated in FIG. 7, a wheel having the surface velocity measured by an LDV was initially rotated for a first period 400, rotation stopped in a second period 410, rotation increased in a series of steps over a third period 420, and rotation abruptly stopped in a fourth period 430. Rotation was abruptly increased in a fifth period 440, and smoothly decreased over a sixth period 450. As can be seen from inspection of FIG. 7, the multiple lower frequencies are present, showing themselves as hash filling under the curve. The desired Doppler difference frequency, representing the velocity of the wheel surface, is represented by the uppermost extent or envelope of the data plot in FIG. 7. The uppermost frequencies can correspond to the HIGHEST_FREQ variable to be extracted, as previously discussed. Subsequent figures utilize the same signal processing algorithm according to the present invention, but using different LIFE and WINDOW parameters, previously discussed.

Figure 8:
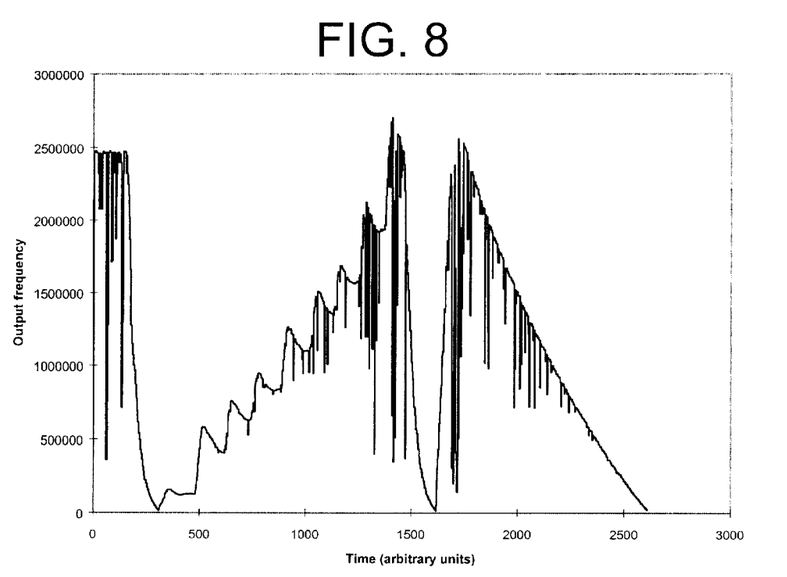
FIG. 8 is a plot of the FIG. 7 frequencies after processing using a maximum highest frequency age or life of 2 and a rolling average window using 3 highest frequencies.
Figure 9:
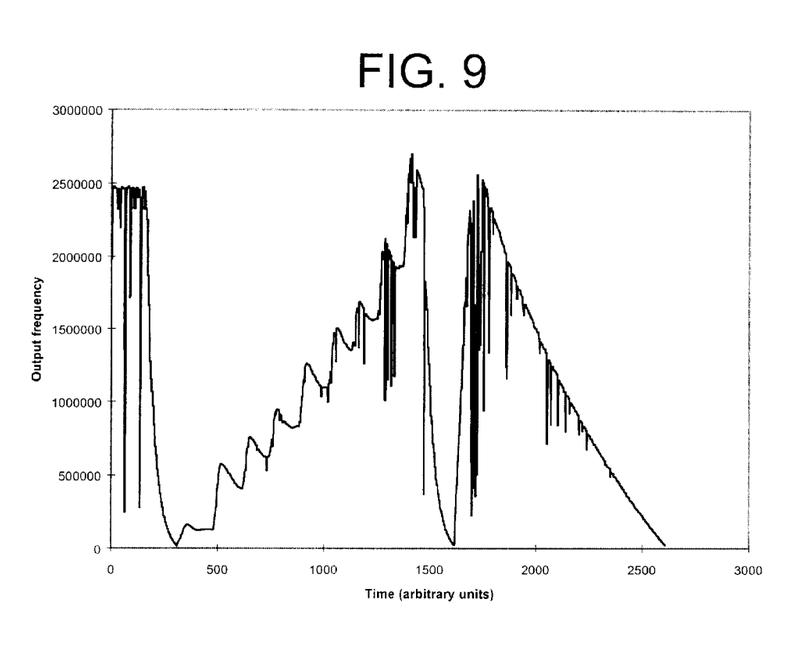
FIG. 9 is a plot of the FIG. 7 frequencies after processing using a maximum highest frequency age or life of 3 and a rolling average window using 3 highest frequencies.
Figure 10:
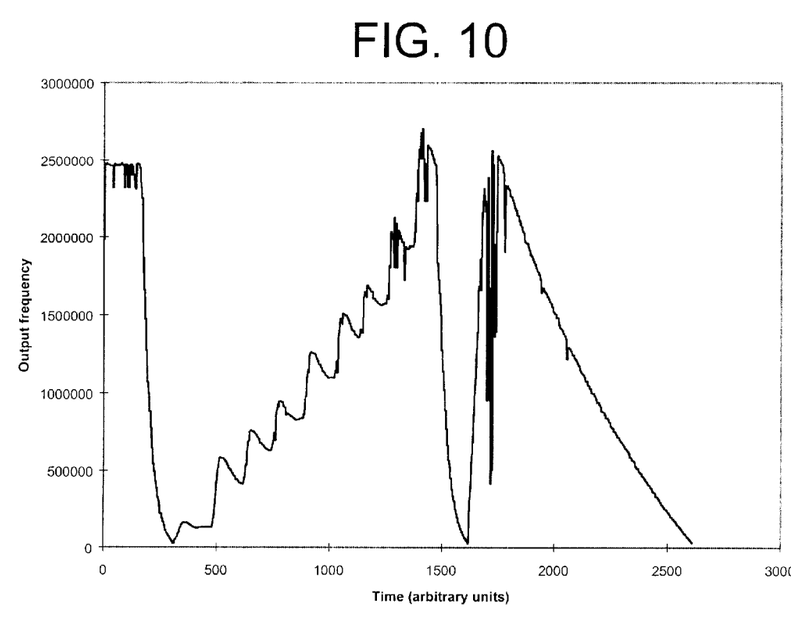
FIG. 10 is a plot of the FIG. 7 frequencies after processing using a maximum highest frequency age or life of 3 and a rolling average window using 4 highest frequencies.
Figure 11:
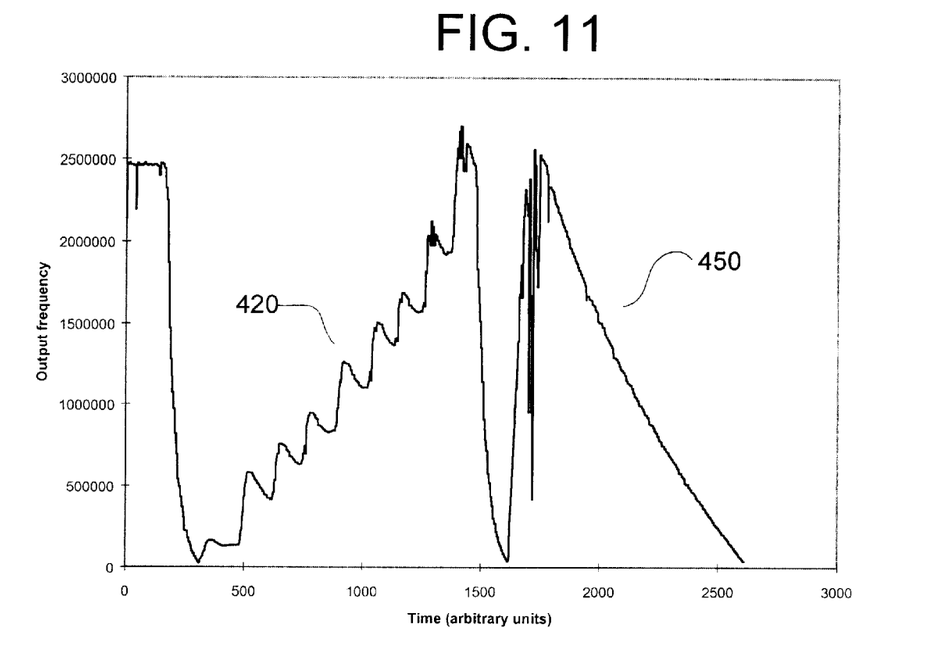
FIG. 11 is a plot of the FIG. 7 frequencies after processing using a maximum highest frequency age or life of 4 and a rolling average window using 4 highest frequencies.

FIG. 8 illustrates the results using a LIFE of 2 and a WINDOW of 3, where the LIFE parameter is the age limit of the highest frequency value and the WINDOW parameter is the population size of highest frequency values being used to calculate a rolling average. As can be seen in FIG. 8, even a small LIFE of 2 and a WINDOW of 3 removes a substantial portion of the lower frequencies forming the hash under the curve in FIG. 7. FIG. 9 utilizes a LIFE of 3 and a WINDOW of 3, while FIG. 10 utilizes a LIFE of 3 and a WINDOW of 4. FIG. 11 utilizes a LIFE of 4 and a WINDOW of 4. As can be seen in regions 420 and 450, the lower frequencies have been largely removed, leaving the highest frequencies representing the true surface velocity of the media.

For the purposes of industrial applications, regions 420 and 450 represent the type of reasonably steady or slow changing regimes that are likely to be encountered. Over an appropriate time scale on the order of the process time constant, any industrial process may be considered a steady or slowly changing process. Thus, the signal processing as represented by FIGS. 8 through 11 is a substantial and useful achievement. The method of FIG. 11 may utilize only a four-place FIFO queue for the LIFE of 4, and a four-place FIFO queue for the rolling average over a WINDOW of 4.

Numerous advantages of the invention covered by this document have been set forth in the foregoing description. It will be understood, however, that this disclosure is, in many respects, only illustrative. Changes may be made in details, particularly in matters of shape, size, and arrangement of parts without exceeding the scope of the invention. The invention's scope is, of course, defined in the language in which the appended claims are expressed.

What is claimed is:

1. A method for processing a LDV output signal provided by a Laser Doppler Velocimeter (LDV), the method comprising:

initializing a highest frequency value;

identifying a measure of the Doppler frequency of the LDV output signal;

comparing the Doppler frequency to the highest frequency value once a measure of the Doppler frequency is identified, and storing the higher of the two frequencies as the new highest frequency value; and repeating the identifying and comparing steps a number of times.

2. A method according to claim 1, wherein the number of times that the identifying and comparing steps are repeated corresponds to a programmable lifetime parameter.

3. A method according to claim 1, further comprising the steps of:

repeating the identifying, comparing, and repeating steps for a number of times, each time storing the corresponding highest frequency value resulting in a corresponding number of highest frequency values; and averaging the corresponding number of highest frequency values, and providing the result as a measure of velocity.

4. A method according to claim 3, wherein the averaging step maintains a rolling average.

5. A method according to claim 3, wherein the preselected number of times that the identifying, comparing, and repeating steps are repeated corresponds to a programmable window parameter.

6. A method according to claim 3, further comprising the steps of:

continuing the repeating and averaging steps of claim 3 for a number of times, and averaging the results to provide a measure of velocity.

7. A method according to claim 5, wherein the number of times that the repeating step of claim 5 is repeated corresponds to a programmable update rate.

8. A method for signal processing a Laser Doppler Velocimeter (LDV) signal stream, the method comprising repeatedly, and in sequence, obtaining an LDV signal, selecting a highest value LDV signal, outputting said highest value LDV signal as an output highest value LDV signal, and periodically reinitializing said highest value LDV signal, wherein said highest value LDV signal corresponds to a highest LDV frequency.

9. A method for signal processing a Laser Doppler Velocimeter (LDV) signal stream, the method comprising repeatedly, and in sequence, obtaining an LDV signal, comparing said LDV signal to a highest LDV signal and setting said highest LDV signal to said LDV signal if said LDV signal is higher than said highest LDV signal, outputting said highest LDV signal as an output highest LDV signal, and periodically reinitializing said highest LDV signal.

10. A method for signal processing an LDV signal as recited in claim 9, wherein said periodic reinitializing includes setting said highest LDV signal to a low value.

11. A method for signal processing an LDV signal as recited in claim 8, wherein said periodic reinitializing includes setting said highest LDV signal to said LDV signal.

12. A method for signal processing an LDV signal as recited in claim 8, wherein said periodic reinitializing has a first period measured in units selected from the group consisting of time and counts.

13. A method for signal processing an LDV signal as recited in claim 8, further comprising filtering said output highest LDV signal in a first filter outputting a first filtered value.

14. A method for signal processing an LDV signal as recited in claim 12, wherein said first filter is a rolling average operating on a number of samples and said first filtered value is a rolling average.

15. A method for signal processing an LDV signal as recited in claim 13, further comprising filtering said first filtered value in a second filter and outputting a second filtered value.

16. A system for processing a LDV output signal provided by a Laser Doppler Velocimeter (LDV), comprising:

identifier block for identifying a measure of the Doppler frequency of the LDV output signal;

comparing block coupled to the identifier block for comparing the Doppler frequency to the highest frequency value;

storing block coupled to the comparing block for storing the higher of the two frequencies as the new highest frequency value; and controller for controlling the identifying, comparing and storing blocks so that the identifier block sequentially provides a number of Doppler frequency measurements to the comparing block and storing blocks, resulting in a final highest frequency value.

17. A system according to claim 16, further comprising:

a first filter for averaging a number of final highest frequency values and to provide an output that is a measure of velocity.

18. A system according to claim 17, wherein the first filter maintains a rolling average of the number of final highest frequency values.

19. A system according to claim 17, further comprising a second filter for averaging a number of outputs from the first filter.

20. An LDV system, comprising:

an LDV sensor; and processing means coupled to said LDV sensor, wherein said processing means has an input, an output, and an executable computer program, wherein said executable computer program causes said processing means to repeatedly, and in sequence, obtain an LDV signal from the LDV sensor, select a highest value LDV signal, output said highest value LDV signal as an output highest value LDV signal, and periodically reinitialize said highest value LDV signal, wherein said highest value LDV signal corresponds to a highest frequency LDV frequency.

21. An LDV system as recited in claim 20, wherein said processing means includes a microprocessor.

22. A method for processing a LDV output signal provided by a Laser Doppler Velocimeter (LDV), the method comprising:

initializing a highest frequency value;

counting a number of cycles of the LDV output signal over a predetermined time period;

identifying a measure of the Doppler frequency of the LDV output signal from the number of cycles counted;

comparing the measure of the Doppler frequency to the highest frequency value, and storing the higher of the two values as the new highest frequency value; and repeating the counting, identifying and comparing steps a number of times.

23. A method according to claim 22, wherein the number of times that the identifying and comparing steps are repeated corresponds to a lifetime parameter.

24. A method according to claim 22, further comprising the steps of:

repeating the counting, identifying, comparing, and repeating steps for a number of times, each time storing the corresponding highest frequency value resulting in a corresponding number of highest frequency values; and averaging the corresponding number of highest frequency values, and providing the result as a measure of velocity.

25. A method according to claim 24, wherein the averaging step maintains a rolling average.

26. A method according to claim 24, wherein the number of times that the counting, identifying, comparing, and repeating steps are repeated corresponds to a window parameter.

27. A method according to claim 24, further comprising the steps of:

continuing the repeating and averaging steps of claim 25 for a number of times, and averaging the results to provide a measure of velocity.

28. A method according to claim 26, wherein the number of times that the repeating step of claim 26 is repeated corresponds to an update rate.

29. A method for processing a LDV output signal having a number of pulses provided by a Laser Doppler Velocimeter (LDV), the method comprising:

initializing a highest frequency value;

identifying a measure of the Doppler frequency of the LDV output signal by counting pulses of the LDV output signal over a predetermined time period; and comparing the Doppler frequency to the highest frequency value, and storing the higher of the two frequencies as the new highest frequency value.

* * * * *